United States Patent
Larmo et al.

(10) Patent No.: US 10,057,824 B2
(45) Date of Patent: Aug. 21, 2018

(54) RADIO LINK MONITORING

(71) Applicant: Telefonaktiebolaget L M Ericsson (publ), Stockholm (SE)

(72) Inventors: Anna Larmo, Espoo (FI); Stefan Wager, Espoo (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/768,467

(22) PCT Filed: Mar. 7, 2013

(86) PCT No.: PCT/SE2013/050202
§ 371 (c)(1),
(2) Date: Aug. 18, 2015

(87) PCT Pub. No.: WO2014/137259
PCT Pub. Date: Sep. 12, 2014

(65) Prior Publication Data
US 2016/0007252 A1  Jan. 7, 2016

(51) Int. Cl.
*H04W 76/19* (2018.01)
*H04W 36/00* (2009.01)
(Continued)

(52) U.S. Cl.
CPC ..... *H04W 36/0088* (2013.01); *H04L 43/0811* (2013.01); *H04W 24/08* (2013.01);
(Continued)

(58) Field of Classification Search
None
See application file for complete search history.

(56) References Cited

U.S. PATENT DOCUMENTS

2010/0113023 A1* 5/2010 Huang ............ H04W 52/0216
455/436
2011/0183663 A1  7/2011 Kenehan et al.
(Continued)

FOREIGN PATENT DOCUMENTS

WO  WO 2010033957 A2 *  3/2010  ............ H04L 1/20
WO  2011123744 A1  10/2011
(Continued)

OTHER PUBLICATIONS

3rd Generation Partnership Project, "3rd Generation Partnership Project; Technical Specification Group Services and System Aspects; Service requirements for Machine-Type Communications (MTC); Stage 1 (Release 12)", Technical Specification, 3GPP TS 22.368 V12.1.0, Dec. 1, 2012, pp. 1-24, 3GPP, France.
(Continued)

*Primary Examiner* — Ayanah George
(74) *Attorney, Agent, or Firm* — Sage Patent Group (57) ABSTRACT

This disclosure relates to radio link monitoring. More particularly, it relates to monitoring radio link failure between a user equipment (UE), which is configured for an extended (i.e. long) discontinuous reception (DRX) time period, and a radio network. A method performed by the UE may comprise retrieving 510 configuration data. Upon detection 520 of connectivity problems towards a radio cell, a parameter configuration of the retrieved configuration data may be applied 530 for monitoring the radio link failure between the UE and the radio network.

28 Claims, 7 Drawing Sheets

(51) Int. Cl.
*H04W 76/28* (2018.01)
*H04W 76/04* (2009.01)
*H04L 12/26* (2006.01)
*H04W 24/08* (2009.01)

(52) U.S. Cl.
CPC ..... *H04W 36/0094* (2013.01); *H04W 76/048* (2013.01); *H04W 76/28* (2018.02)

(56) References Cited

U.S. PATENT DOCUMENTS

| | | | |
|---|---|---|---|
| 2011/0217973 A1 | 9/2011 | Sagfors et al. | |
| 2012/0236834 A1* | 9/2012 | Ho | H04W 52/0216 370/337 |
| 2014/0198672 A1* | 7/2014 | Koo | H04W 72/1215 370/252 |

FOREIGN PATENT DOCUMENTS

| | | | | |
|---|---|---|---|---|
| WO | WO 2011123744 A1 * | 10/2011 | ............ | H04W 24/10 |
| WO | 2013137788 A1 | 9/2013 | | |

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 11)", Technical Specification, 3GPP TS 36.331 V11.2.0, Dec. 1, 2012, pp. 1-340, 3GPP, France.

3rd Generation Partnership Project, "3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Technical Specification, 3GPP TS 36.300 V11.4.0, Dec. 1, 2012, pp. 1-208, 3GPP, France.

3rd Generation Partnership Project, "3rd Generation Partnership Project; Technical Specification Group Radio Access Network; Evolved Universal Terrestrial Radio Access (E-UTRA); Requirements for support of radio resource management (Release 11)", Technical Specification, 3GPP TS 36.133 V11.3.0, Dec. 1, 2012, pp. 1-661, 3GPP, France.

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 11)", Technical Specification, 3GPP TS 36.304 V11.2.0, Dec. 1, 2012, pp. 1-33, 3GPP, France.

3rd Generation Partnership Project, "3rd Generation Partnership Project; Technical Specification Group Radio Access Network; Evolved Universal Terrestrial Radio Access (E-UTRA); Requirements for support of radio resource management (Release 11)", Technical Specification, 3GPP TS 36.133 V11.1.0, Jun. 1, 2012, pp. 1-610, 3GPP, France.

3rd Generation Partnership Project, "3rd Generation Partnership Project; Technical Specification Group Radio Access Network; Radio Resource Control (RRC); Protocol specification (Release 11)", Technical Specification, 3GPP TS 25.331 V11.4.0, Dec. 1, 2012, pp. 1-2056, 3GPP, France.

* cited by examiner

| Timer | Start | Stop | At expiry |
|---|---|---|---|
| T310 | Upon detecting physical layer problems i.e. upon receiving N310 consecutive out-of-sync indications from lower layers | Upon receiving N311 consecutive in-sync indications from lower layers, upon triggering the handover procedure and upon initiating the connection re-establishment procedure | If security is not activated: go to RRC_IDLE else: initiate the connection re-establishment procedure |
| T311 | Upon initiating the RRC connection re-establishment procedure | Selection of a suitable E-UTRA cell or a cell using another RAT. | Enter RRC_IDLE |

| Constant | Usage |
|---|---|
| N310 | Maximum number of consecutive "out-of-sync" indications received from lower layers |
| N311 | Maximum number of consecutive "in-sync" indications received from lower layers |

RADIO LINK MONITORING

TECHNICAL FIELD

Embodiments of the present invention presented herein generally relate to radio link monitoring, and more particularly, the monitoring of radio link failure between a user equipment (UE) and a radio network.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Communication devices such as User Equipments (UE) are also known as terminals, user terminals (UTs), wireless terminals, wireless transmit/receive units (WTRUs), etc. UEs are generally enabled to communicate wirelessly in a radio network, which may sometimes also be referred to as e.g. cellular communication network, wireless communication system, cellular radio system or cellular network. The communication may be performed e.g. between two UEs, between a user equipment and a regular telephone and/or between a UE and a server via a Radio Access Network (RAN) and possibly one or more core networks (CN), comprised within the cellular communications network.

UEs may further be referred to as mobile telephones, cellular telephones, laptops, or tablet computers with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another UE or a server. The term UE as used herein also comprises Machine Type Communication (MTC) devices, i.e. devices with communication capability of machine-type. Examples of MTC devices include e.g. devices such as sensors, measurement devices etc that do not necessarily involve any interaction with a user. More information on MTC use case scenarios and examples of MTC devices can be found e.g. in the *Technical Specification* 3*GPP TS* 22.368 *V*12.1.0.

The radio network generally covers a geographical area which is divided into cell areas, wherein each cell area is served by a base station, e.g. a Radio Base Station (RBS), which sometimes may be referred to as e.g. "base station", "eNodeB", "NodeB", "B node", or BTS (Base Transceiver Station), depending on the technology and terminology used. The base stations may be of different classes such as e.g. macro eNodeB, home eNodeB or pico base station, based on transmission power and/or cell size. A cell is the geographical area where radio coverage is provided by the base station at a base station site.

LTE Mobility

Mobility management may be a challenging task in cellular communications systems and a well functioning mobility performance may therefore be important to the quality experienced by the end user. The Radio Resource Control protocol, RRC, see e.g. the *Technical Specification* 3*GPP TS* 36.331 *V*11.2.0, is the main signaling protocol for configuring, re-configuring and general connection handling in the Long Term Evolution (LTE) radio access network (E-UTRAN). RRC controls many functions such as connection setup, mobility, measurements, radio link failure and connection recovery.

A UE in LTE can be in two RRC states: RRC_CONNECTED and RRC_IDLE. In RRC_CONNECTED state, mobility is generally network-controlled based on e.g. measurements provided by the UE. That is, the network decides when and to which cell a UE should be handed over, based on e.g. measurement reports provided by the user equipment. The network, i.e. the LTE radio base station which is called evolved NodeB (eNB) in E-UTRAN, configures various measurement events, thresholds etc based on which the UE then sends reports to the network, such that the network can make a decision to hand over the UE to a better cell as the UE moves away from its present cell.

Figure 1:
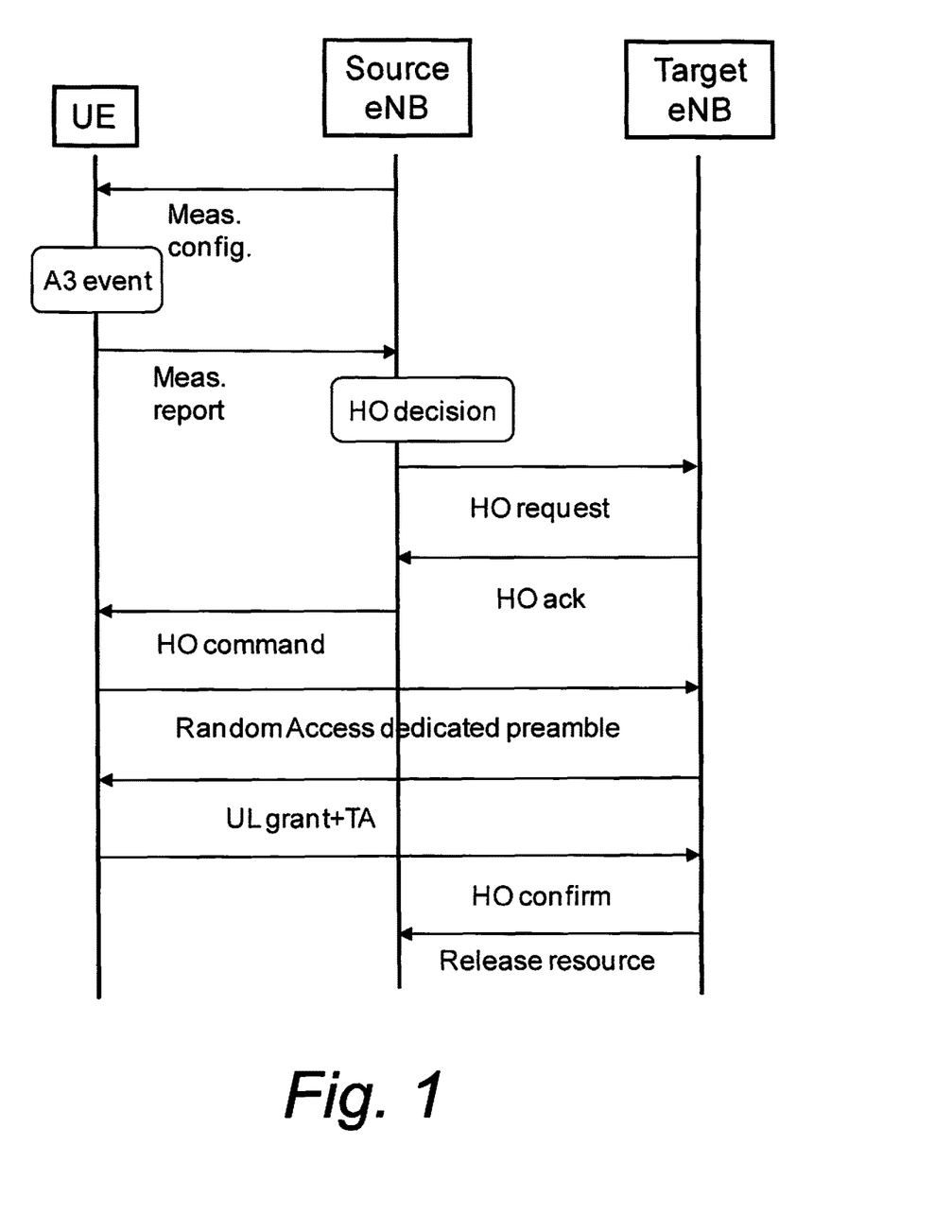
FIG. 1 shows a simplified signaling diagram illustrating the LTE handover procedure.

A detailed illustration of a LTE RRC handover procedure can be found in section 10.1.2 of the *Technical Specification* 3*GPP TS* 36.300 *V*11.4.0, see e.g. FIG. 10.1.2.1-1. FIG. 1 illustrates a simplified signaling scheme of the LTE handover, HO, procedure presented therein. It should be noted that the HO command shown in FIG. 1 is in fact prepared in the Target eNB, i.e. the eNodeB that the UE will be handed over to, but the message is transmitted via the Source eNB. That is, from the UE's perspective the message comes from the Source eNB (although it originates from the Target eNB).

In RRC_IDLE, mobility is generally handled by UE-based cell-selection, where a "nomadic" UE selects the best cell to camp on, based e.g. on various specified criteria and parameters that are broadcasted in the cells. For example, various cells or frequency layers could be prioritized over other cells or frequency layers, such that the UE tries to camp on a particular cell as long as the measured quality of a beacon or pilot in that cell is a threshold better than some other beacon or pilot received from other cells.

The present disclosure is primarily focusing on challenges associated with network-controlled mobility as described above, i.e. for an UE in the RRC_CONNECTED state. Some of the challenges associated with failing handovers are therefore described in further detail below:

In a regular situation, and when a UE in RRC_CONNECTED state is moving out from the coverage of a first cell, also called source cell, it should be handed over to a neighboring cell, also called target cell or second cell before loosing the connection to the first cell. In other words, it is desirable that the connection is maintained with no or minimal disruption throughout the handover, such that the end-user is unaware of the ongoing handover. In order to succeed with this, it is important that:

- the measurement report that indicates the need for mobility is transmitted by the UE and received by the Source eNB, and
- the Source eNB has sufficient time to prepare the handover to the target cell (by, among other things, requesting a handover from the Target eNB controlling the target cell), and
- the UE receives the handover command message from the network, as prepared by the Target eNB in control of the target cell and sent via the source cell to the user equipment, see FIG. 1.

In addition, and in order for the handover to be successful, the user equipment must finally succeed in establishing a connection to the target cell, which in LTE generally requires a successful random access request in the target cell, and a subsequent transmission of a HO complete message from the UE to the Target eNB.

Thus, in order for the handover to succeed, it may be important that the sequence of events leading to a successful handover is started sufficiently early, so that the radio link to the first cell over which this signaling takes place does not deteriorate too much before completion of the signaling. If such deterioration happens before the handover signaling is completed in the source cell (i.e. first cell), then the handover is likely to fail. Such handover failures are clearly not desirable. The current RRC specification, i.e. 3GPP TS 36.331 V11.2.0, therefore provides various triggers, timers, and thresholds in order to adequately configure measurements, such that the need for handovers can be detected reliably, and sufficiently early.

In FIG. 1, the exemplified measurement report is generally triggered by a measurement event called A3 event, which in short means that a neighbor cell is found to be an offset better than the current serving cell. This means that a measurement report is sent to the network when a criterion or criteria associated with the event is satisfied. There exists many different measurement event types, and it should be noted that there are multiple events that could be configured to trigger a measurement report.

Radio Link Failure (RLF) and RRC Connection Re-Establishment

It may occur that a UE looses coverage to the cell that the UE is currently connected to. This could occur in a situation when a UE enters a fading dip, or that a handover was needed as described above, but the handover failed for one or another reason. This may be particularly true if the "handover region" is very short, as will be further described below.

The quality of the radio link is typically monitored in the user equipment e.g. on the physical layer, as described in the technical specifications 3GPP TS 36.300 V11.4.0 (see e.g. section 10.1.6), 3GPP TS 36.331 V11.2.0 (see e.g. section 5.3.11), and 3GPP TS 36.133 V11.3.0 (see e.g. Annex A.7.3), and summarized below.

Figure 2:
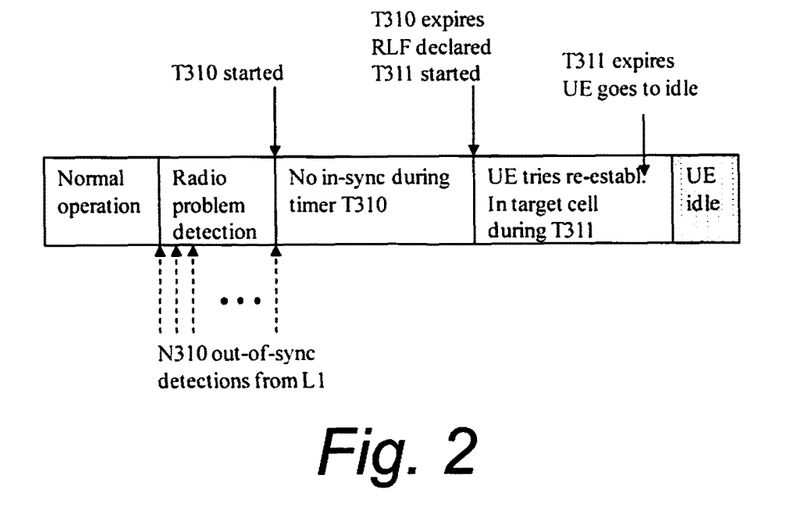
FIG. 2 shows how Radio Link Failure (RLF) is generally declared in LTE.

Upon detection that the physical layer experiences problems according to criteria defined in e.g. 3GPP TS 36.133 (see e.g. Annex A.7.3), the physical layer can send an indication to the RRC protocol of the detected problems called out-of-sync indication. After a configurable number, N310, of such consecutive indications, a timer, T310, is started. If the link quality is not improved (i.e. recovered) while T310 is running, i.e. there are no N311 consecutive "in-sync" indications from the physical layer, a radio link failure, RLF, is declared in the UE, see FIG. 2.

The currently relevant timers and counters described above are listed in FIG. 3 for reference. The UE may e.g. read the timer values and counter values from system information broadcasted in the cell. Alternatively, it is possible to configure the UE with UE-specific values of the timers and counter values using dedicated signaling, e.g. where specific values are provided to specific user equipments with messages directed only to one or more specific UEs.

Figure 3:
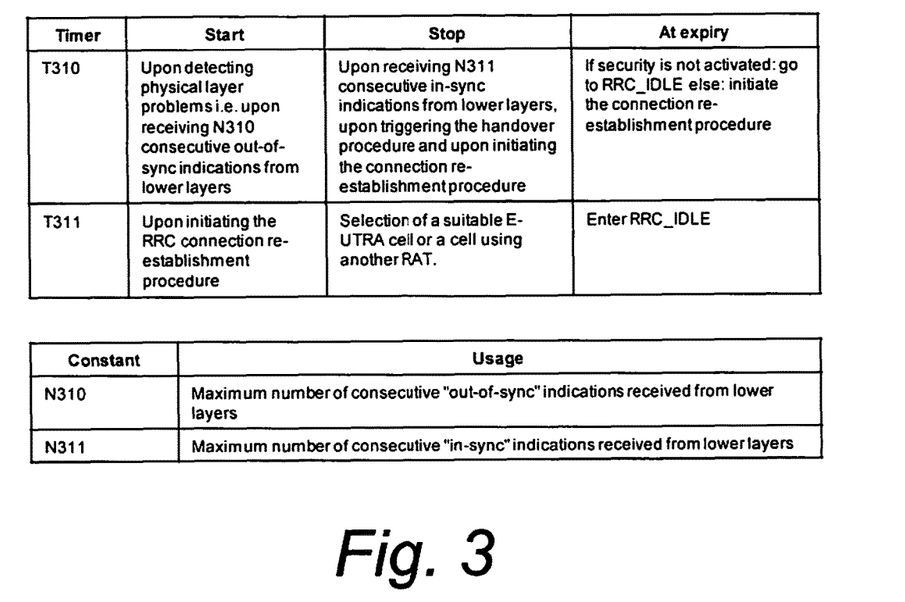
FIG. 3 shows how RLF is monitored in LTE.

The function of the timers and counters used for monitoring radio link failure in LTE is presented in the tables of FIG. 3.

If T310 expires, the UE initiates a connection re-establishment to recover the ongoing RRC connection. This procedure includes cell selection by the UE. That is, the RRC_CONNECTED user equipment shall try to autonomously find a better cell to connect to, since the connection to the previous cell failed according to the described measurements. It could occur that the UE returns to the first cell anyway, but the same procedure is also then executed. Once a suitable cell is selected as further described e.g. in the technical specification 3GPP TS 36.304 V11.2.0 (see e.g. section 5.2), the UE requests to re-establish the connection in the selected cell. To this end, it is important to note the difference in mobility behavior as an RLF results in UE-based cell selection, in contrast to the normally applied network-controlled mobility.

If the re-establishment is successful, which depends on, among other things, if the selected cell and the eNB controlling that cell was prepared to maintain the connection to the user equipment, which implies that is was prepared to accept the re-establishment request, then the connection between the user equipment and the eNB can resume. In LTE, a re-establishment procedure generally includes a random-access request in the selected cell, followed by higher layer signaling where the user equipment sends a message with content based on which the UE can be identified and authenticated. This may be needed so that the network can trust that it knows exactly which UE is attempting to perform the re-establishment.

A failure of a re-establishment means that the UE goes to the RRC_IDLE state and the connection is generally released. To continue communication, a new RRC connection then has to be requested, and established. A failure could occur e.g. if the eNB that receives the re-establishment request is not able to identify the UE that requests the re-establishment. Such a condition may occur if the receiving eNB has not been informed or prepared for a possible re-establishment from this particular UE.

The reason for introducing the timers T310 and counters N310 described above is to add some freedom and hysteresis for configuring the criteria for when a radio link should be considered as failed and need to be re-established. This is desirable, since otherwise it would affect the end-user performance negatively if a connection was abandoned prematurely if it turned out that the loss of link quality was temporary and the UE succeeded in recovering the connection without any further actions or procedures, e.g. before T310 expires, or before the counter reaches value N310.

SUMMARY

It is in view of the above considerations and others that the various embodiments of the present invention have been made.

There is still a need to provide a solution which allows for improved handling of radio link monitoring, which in turn may lead to a reduced number of unnecessary handover failures leading to connection releases. A general object of the various embodiments of the present invention is to allow for an improved radio link monitoring particularly (though not exclusively) for UEs, such as MTC devices, which typically have different communication needs compared to traditional UEs.

According to a first aspect, there is provided a method performed by a user equipment (UE) for monitoring radio link failure between said UE and a radio network. The UE is configured for an extended discontinuous reception, DRX, time period, i.e. a DRX time period having a length that is longer than an ordinary DRX time period. The method comprises:

retrieving configuration data, wherein the configuration data includes a parameter configuration which is defined in dependence of a length of the extended DRX time period; and upon detection of connectivity problems towards a radio cell, applying the parameter configuration for monitoring radio link failure.

In one embodiment, retrieving configuration data comprises retrieving the configuration data from a memory of the UE. Furthermore, the parameter configuration may comprise a timer value. Applying the parameter configuration for monitoring the radio link failure may then comprise starting a timer and apply said timer value. The method may additionally comprise initiating connection re-establishment to another cell upon expiration of said timer value. Advantageously, the timer value may be shorter the longer the extended DRX time period is. In yet another embodiment, the parameter configuration may additionally comprise a counter value. Applying the parameter configuration for monitoring the radio link failure may then comprise starting a counter and applying said counter value. The method may additionally comprise starting said timer upon reaching said counter value. Advantageously, the counter value may be lower the longer the extended DRX time period is. In still another embodiment, the parameter configuration also comprises a counter value. However, in this alternative embodiment applying the parameter configuration for monitoring the radio link failure comprises starting the counter, applying said counter value, and, additionally, initiating connection re-establishment to another radio cell upon reaching said counter value. Again, the counter value may be lower the longer the extended DRX time period is.

In still another embodiment, retrieving configuration data comprises receiving a configuration message from the radio network. The configuration message comprises the configuration data including the parameter configuration. Here, the parameter configuration is defined by the radio network. Moreover, the parameter configuration may comprise a timer value. Applying the parameter configuration may comprise starting a timer and applying said timer value. The method may additionally comprise initiating connection re-establishment to another radio cell upon expiration of said timer value. In a still further embodiment, the parameter configuration may comprise a counter value. Applying the parameter configuration may comprise starting a counter and applying said counter value. The method may additionally comprise starting said timer upon reaching said counter value. In another example embodiment, the parameter configuration also comprises a counter value. However, in this alternative embodiment applying the parameter configuration for monitoring the radio link failure comprises starting the counter, applying said counter value, and, additionally, initiating connection re-establishment to another radio cell upon reaching said counter value. Again, the counter value may be lower the longer the extended DRX time period is.

In one embodiment, the method may additionally comprise estimating a mobility state of the UE, and adjusting a parameter configuration depending on the estimated mobility state of the UE. For example, a timer value may be adjusted depending on an estimated mobility state of the UE. Additionally, or alternatively, a counter value may be adjusted depending on the estimated mobility state of the UE.

According to a second aspect, there is provided a method performed by a radio network node for monitoring radio link failure between a radio network and a user equipment (UE). The method comprises:

generating configuration data including a parameter configuration, wherein the parameter configuration is generated in dependence of a length of an extended discontinuous reception DRX time period used by a UE and wherein the extended DRX time period has a length that is longer than an ordinary DRX time period; and transmitting a configuration message to said UE, wherein the configuration message comprises the generated configuration data.

In one embodiment, generating configuration data comprises generating a parameter configuration comprising a timer value for use when monitoring radio link failure. In turn, generating the parameter configuration may comprise generating a timer value to be shorter the longer the extended DRX time period is.

In still another embodiment, generating configuration data comprises generating a parameter configuration comprising a counter value for use when monitoring radio link failure. In turn, generating the parameter configuration may comprise generating a counter value to be lower the longer the extended DRX time period is.

The length of the above-mentioned ordinary DRX time period is typically relatively short of an order of a few seconds (e.g. 10 seconds or so) at most. As a particular example, the maximum specified DRX time period in 3GPP E-UTRAN is 2.56 seconds, see e.g. the Technical Specification 3GPP TS 36.331 V11.2.0. As another particular example, the maximum specified DRX time period in 3GPP UTRAN is 5.12 seconds, see e.g. the Technical Specification 3GPP TS 25.331 v11.4.0. These relatively short ordinary DRX time periods are well suited for use by UEs that are typically used for Human-to-Human (H2H) communication. Examples of UEs used for H2H communication thus include mobile phones, cell phones, smart phones, personal digital assistants, tablet and laptop computers and the like.

However, and according to the above-mentioned aspects, it is proposed to extend the DRX for the UE beyond the ordinary, or normal, DRX time period. Or said differently, the UE is configured for an extended DRX time period, which is longer than the length of the ordinary DRX time period. For example, the length of the extended DRX time period may be longer than 2.56 seconds, as is specified in the Technical Specification 3GPP TS 36.331 V11.2.0.

An extended DRX time period would be particularly advantageous for MTC devices, largely because it may keep down the frequency of paging messages and other signals being sent, and it may keep down power consumption of the MTC devices, etcetera. The extended DRX time period may be at least longer than 2.56 seconds and probably several minutes depending on the type of MTC device. For some MTC devices, it is even conceivable that the extended DRX time period is an hour, several hours, 24 hours or even several days depending on the type of MTC device.

However, the inventors have realized that the use of an extended DRX time period may give rise to a number of challenges. For example, the frequency of mobility measurements is generally tied to the ordinary DRX time period, i.e. 2.56 seconds in case of LTE (see 3GPP TS 36.331 V11.2.0). Currently, the UEs are only required to measure a single sample of the downlink Reference Symbol Received Power (RSRP) during the ordinary DRX time period, see 3GPP TS 36.133 v.11.1.0 (see e.g. section 8.1.2.2.1). A measurement is typically based on several samples acquired over a certain period of time. As is specified in 3GPP TS 36.133, for example the five latest samples may be used to perform one measurement. As the length of the extended DRX time period is longer than the ordinary, or normal, DRX time period, the time it takes to acquire the needed number of samples may thus also be increased with the comparatively longer extended DRX time period. Thus, the inventors have realized that it may become more likely that a UE configured for an extended DRX time period may move away from a coverage area of the current serving cell before a measurement indicating the need for handover has been acquired. In case the aforementioned occurs, the UE will likely experience radio link failure and the measurement report denoting the event cannot be transmitted.

In view of this, it is therefore proposed to provide configuration data including a parameter configuration, which is defined in dependence of the length of the comparatively longer extended DRX time period. Upon detection of connectivity problems, this parameter configuration can be applied for monitoring radio link failure. By defining the parameter configuration depending on the length of the extended DRX time period, it is made possible to adopt the radio link failure monitoring to the comparatively longer extended DRX time period. In advantageous embodiments presented herein the parameter configuration comprises a timer value and/or a counter value. By, for example, using a relatively small value of the timer value and/or the counter value for UEs configured for extended, or long, DRX time periods it is made possible to speed up the radio link failure monitoring, and thus radio link failure detection. In turn, by speeding up the radio link failure detection, connection re-establishment to another, potentially better, cell can be performed more quickly. Consequently, it is made possible to prevent the triggering of handovers that could otherwise occur.

According to yet another aspect, there is provided a user equipment UE, such as a MTC device, for monitoring radio link failure between said UE and a radio network. The UE may be configured to implement, or otherwise perform, the hereinabove described method of the first aspect. To this end, the UE is configured for an extended discontinuous reception, DRX, time period. This extended DRX time period has a length, which is longer than an ordinary DRX time period. The UE comprises a processor and a memory. The memory may store computer program code, which, when run in the processor causes the UE to retrieve configuration data, the configuration data including a parameter configuration which is defined in dependence of the length of extended DRX time period; and upon detection of connectivity problems towards a radio cell, to apply the parameter configuration for monitoring radio link failure.

According to still another aspect, there is provided a radio network node (e.g. a eNB) for monitoring radio link failure between a radio network and a user equipment (UE). The radio network node may be configured to implement or otherwise perform the hereinabove described method of the second aspect. The radio network node comprises a transmitter, a processor and a memory. The memory stores computer program code, which, when run in the processor causes the radio network node to generate configuration data including a parameter configuration, wherein the parameter configuration is generated in dependence of a length of an extended discontinuous reception DRX time period used by said UE and wherein the extended DRX time period has a length that is longer than an ordinary DRX time period. Furthermore, the transmitter is configured to transmit a configuration message to the UE, wherein the configuration message comprises the generated configuration data.

BRIEF DESCRIPTION OF THE DRAWINGS

These and other aspects, features and advantages of the invention will be apparent and elucidated from the following description of embodiments of the present invention, reference being made to the accompanying drawings, in which.

DETAILED DESCRIPTION

The invention will now be described more fully hereinafter with reference to the accompanying drawings, in which certain embodiments of the invention are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

The various embodiments presented herein will be described within the context of E-UTRAN, also referred to as LTE. It should be understood that the challenges and solutions described herein are equally applicable to radio access networks and user equipments implementing other access technologies and standards as well, for example UTRAN. Thus, LTE is only used as an example technology where the disclosed embodiments are particularly suitable. Furthermore, as used in the following the term "user equipment (UE)" is any device, which can be used by a user to communicate. Also, the term UE may be referred to as a mobile terminal, a terminal, a user terminal (UT), a wireless terminal, a wireless communication device, a wireless transmit/receive unit (WTRU), mobile phone, cell phone, etc. Yet further, the term UE includes MTC devices, which do not necessarily involve human interaction. Moreover, the term "radio network node" as used herein generally denotes a fixed point being capable of communicating with the UE. As such, it may be referred to as a base station, a NodeB or an evolved NodeB (eNB), access point, relay node, etcetera.

Various alternative embodiments will be described in the following using non-limiting examples.

Figure 4:
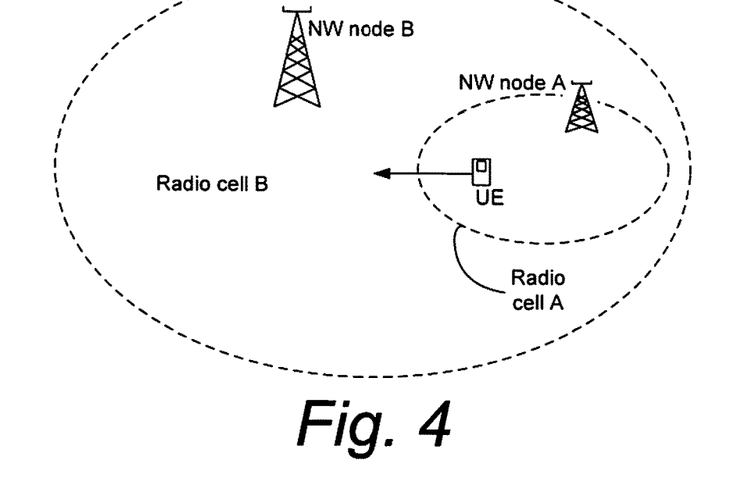
FIG. 4 shows a schematic illustration of an example scenario in a radio access network.

With reference to an exemplary scenario in FIG. 4, consider a UE in connected mode, i.e. in RRC_CON- NECTED state, implementing network-controlled mobility. Furthermore, consider the UE being connected to a first radio cell, i.e. radio cell A. With the notation "connected to a radio cell", it should be appreciated that this implies that the UE is configured to transmit and/or receive data in at least this radio cell. Sometimes, this radio cell is also called "serving cell", "source cell", or "primary cell, PCell". The radio cell is typically controlled by a radio network node such as a radio base station, which means that "connected to a radio cell" is in this respect equivalent to the UE being "connected to a radio base station". That is, the radio base station is in control of the aforementioned radio cell. Sometimes, this radio base station is called Serving eNB, or serving radio base station.

In the example scenario illustrated in FIG. 4, the first radio cell A is "surrounded" by a second radio cell B, which provides coverage in a comparatively larger area. If the UE is moving out from the coverage of the comparatively smaller first radio cell A, it could quickly loose coverage of the first radio cell A that it is currently connected to. In such a scenario, there is generally a relatively high likelihood that the UE looses connectivity to the first radio cell A before a handover is completed. This means that the UE will experience a radio link failure (RLF) resulting in an undesired interruption in connectivity. The same problem could occur if a UE moves from the second radio cell B to another radio cell, where there is a very short handover region, as previously described.

Those skilled in the art will appreciate that the scenario in FIG. 4 is an example only. Thus, it should be appreciated that the various embodiments disclosed herein can be realized in other scenarios as well.

Figure 5:
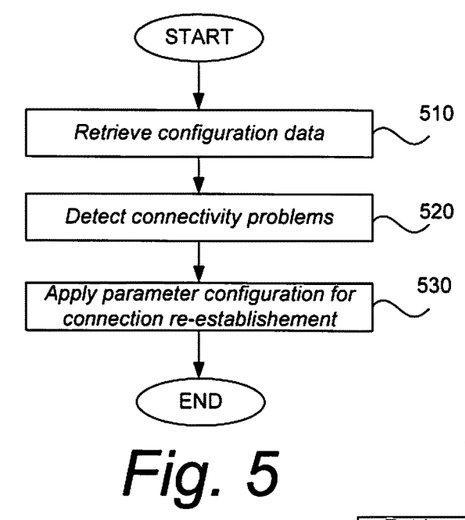
FIG. 5 shows a flowchart of a method according to an embodiment performed in a user equipment.

With reference to FIG. 5, an example embodiment of a method performed by a UE is described. The UE is configured for an extended DRX time period. As used herein, an extended DRX time period is used to mean a DRX time period which is at least longer than an ordinary, or normal, DRX time period. The length of this ordinary, or normal, DRX time period, i.e. the length of the time the UE is (at least partially) powered down or "asleep" between reception periods, is typically quite short, of the order of a few seconds (e.g., 10 seconds or so) at most. As a particular example, the maximum specified DRX time period in 3GPP E-UTRAN is 2.56 seconds, see e.g. the Technical Specification 3GPP TS 36.331 V11.2.0. As another particular example, the maximum specified DRX time period in 3GPP UTRAN is 5.12 seconds, see e.g. the Technical Specification 3GPP TS 25.331 v11.4.0. Consequently, the length of the extended DRX time period may for example be longer than the 2.56 seconds, as specified in 3GPP TS 36.331 V11.2.0. As was described previously, extended DRX time periods may be particularly advantageous for MTC devices. Therefore, the UE may be embodied as a MTC device.

Figure 6:
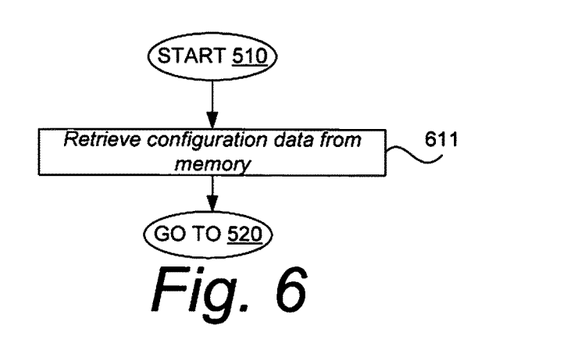
FIG. 6 shows a flowchart of a method according to an embodiment performed in a user equipment.
Figure 7:
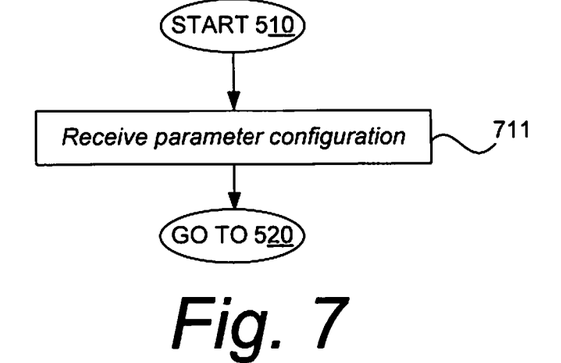
FIG. 7 shows a flowchart of a method according to an embodiment performed in a user equipment.

The UE retrieves 510 configuration data. In one implementation, the UE retrieves 611 (see FIG. 6) the configuration data from a memory of the UE. In other words, the configuration data may be stored in a memory of the UE. The configuration data may e.g. be pre-loaded into the memory of the UE. Alternatively, the UE may be configured to store configuration data upon receipt of a configuration message including the configuration data. In one alternative implementation, the UE receives 711 (see FIG. 7) a configuration message from the radio network, e.g. from the serving eNB. The configuration message comprises configuration data. Thus, the UE can retrieve the configuration data from the received configuration message. Said configuration message may for example be received by the UE on a broadcast channel or via dedicated signaling.

The configuration data comprises a parameter configuration to be used by the UE upon detection of connectivity problems towards the first radio cell A, as will be further detailed herein below.

With further reference to FIGS. 4 and 5, as the UE moves out of coverage from the coverage region of the first radio cell A or when the coverage region provided by the serving eNB is otherwise changed, the UE will generally detect 520 connectivity problems related to the connectivity towards the first radio cell A. The detection 520 of connectivity problems may be performed in various ways. In one implementation, the detection of connectivity problems may comprise measuring Reference Signal Received Power (RSRP), or Reference Signal Received Quality (RSRQ), below a certain threshold value towards the first cell. For example, the radio network (e.g. a eNB thereof) may configure the UE with a threshold value or threshold values for RSRP and/or RSRQ that defines whether the UE should consider the connection to the serving radio cell as problematic. In other implementations, the detection 520 of connectivity problems may comprise receiving an out-of-sync indication from the physical layer, as previously described. According to yet another alternative, the detection 520 of connectivity problems may comprise starting a timer when a measurement event related to a handover, e.g. an A3 event, is detected. If no handover has been executed before the timer expires, the UE determines that connectivity problems are detected.

Figure 8:
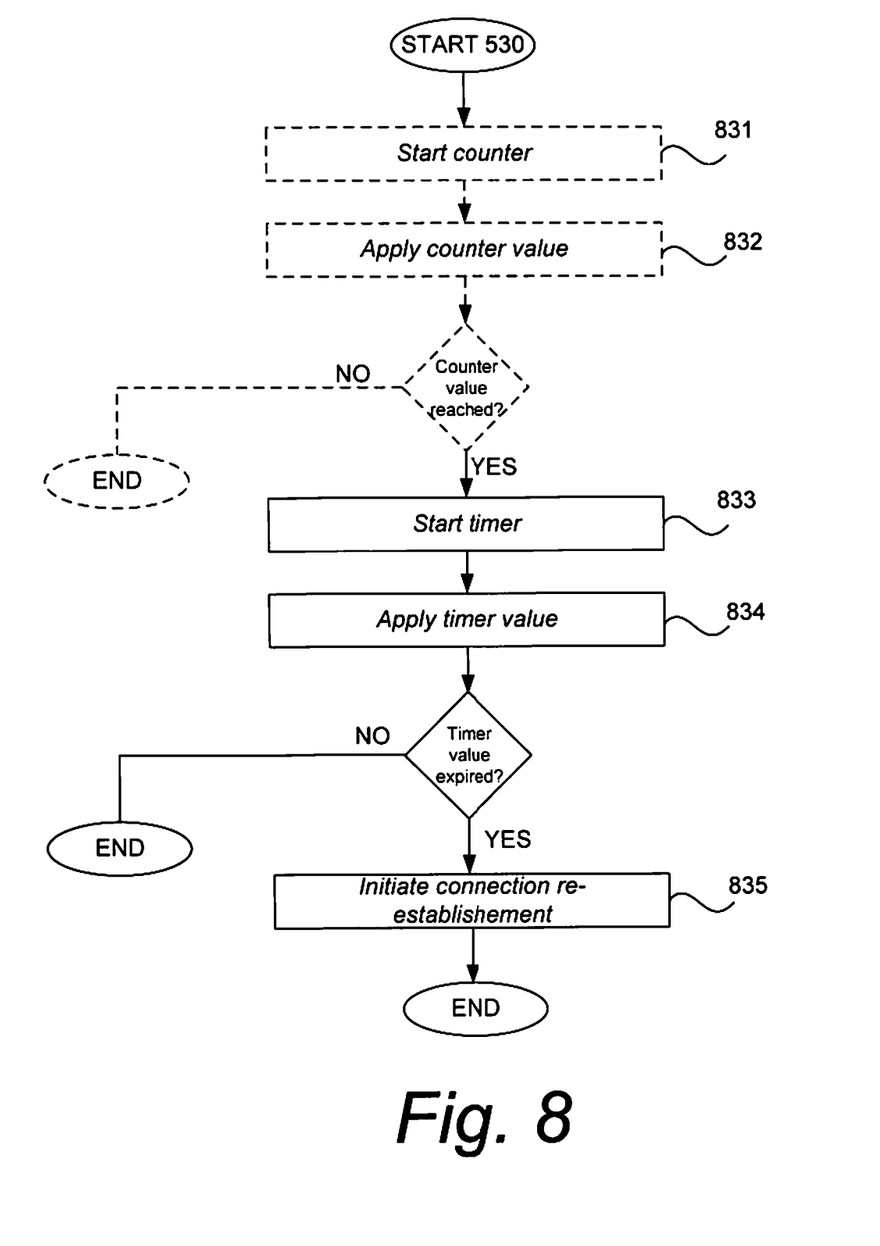
FIG. 8 shows a flowchart of a method according to an embodiment performed in a user equipment.

Upon detection of connectivity problems, the parameter configuration is applied 530 or otherwise utilized by the UE for monitoring the RLF. With reference to FIG. 8, an example implementation of the UE applying 530 the parameter configuration will be described. The parameter configuration may comprise a counter value. The counter value may be a counter value N310. The counter value N310 may represent the maximum number of consecutive "out-of-sync" indications received by the UE from lower layers as described with respect to FIG. 3. Advantageously, this counter value N310 is configured to be lower the longer the extended DRX time period is. For example, the counter value can be set to any of the following values: 10, 9, 8, 7, 6, 5, 4, 3, 2, 1. A counter is started 831 and the counter value is applied 832. If the counter value is not reached, the method discontinues. If, or when, the counter value is reached a timer is started 833. That is, the timer may be conditionally started depending on whether or not the counter reaches the counter value, e.g. the maximum the maximum number of consecutive "out-of sync" indications. To this end, the parameter configuration may additionally comprise a timer value. The timer value may be a timer value T310. Advantageously, this timer value T310 is configured to be shorter the longer the extended DRX time period is. For example, the timer value can be set to any of the following values (in milliseconds): 1000, 900, 800, 700, 600, 500, 400, 300, 200, 100, 75, 50, 25, 10. If the timer expires, i.e. the timer value is reached, the method continues. Otherwise, the method discontinues. Consequently, at expiry of the timer value, connection re-establishment will be initiated 835. Only then, the UE selects a radio cell towards which the UE performs a re-establishment request.

As a mere example, table 1 indicates how counter values (e.g. N310) and/or timer values (e.g. T310) could be selected to be dependent on different lengths of the DRX cycle. It should of course be noted that other values than the ones presented in Table 1 are equally possible.

TABLE 1

Example combinations of timer values and/or counter values.

| DRX cycle (seconds) | N310 (number) | T310 (milliseconds) |
|---|---|---|
| 2.56 | 3 | 1000 |
| 5.12 | 2 | 800 |
| 10.24 | 2 | 700 |
| 20.48 | 1 | 500 |
| 40.96 | 1 | 400 |
| 81.92 | 1 | 200 |
| 163.84 | 1 | 100 |

According to this particular embodiment, re-establishment is initiated to a neighboring radio cell immediately after the counter value of the counter has been reached and the following timer value of the timer has been reached. This means that the re-establishment is initiated as soon as said two conditions (i.e. reached counter and timer values) are fulfilled. By, for example, using a relatively small value of the timer value and/or counter value for UEs configured for extended, or long, DRX time periods it is made possible to speed up RLF monitoring and, thus, radio link failure detection. In other words, it is possible to perform RFL monitoring quicker than would otherwise be the case if the UE would instead use the "normal" counter values and/or timer values as currently standardized. By speeding up the RFL monitoring, connection re-establishment to another, potentially better, radio cell can also be performed quicker. Consequently, it is made possible to prevent the triggering of handovers that could otherwise occur.

The naming of the timer values and counter values hereinabove should be seen as examples only and do not imply any limitations to the applicability of the herein disclosed embodiments. Numerous variations and combinations are conceivable. It should be appreciated that in some embodiments, only a timer is used and, then, only a timer value is applied. In yet other alternative embodiments, it is conceivable to use a counter only and, thus, apply a counter value only. By using either of the timer and the counter only, it may be possible to accelerate the RLF monitoring even further.

Figure 9:
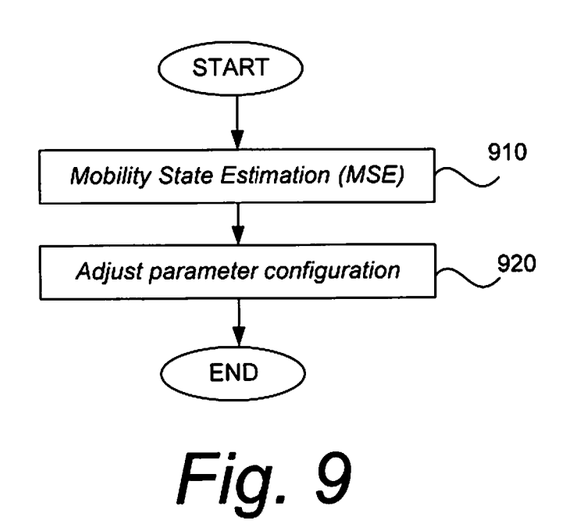
FIG. 9 shows a flowchart of a method according to an embodiment performed in a user equipment.

In still a further example embodiment, the UE speed may be used to adapt, or adjust, the aforementioned parameter configuration depending on the speed of the UE. According to an example implementation, a UE Mobility State Estimation (MSE) may be used to adjust the parameter configuration in the UE. MSE is for example described in 3GPP TS 36.331 v.11.2.0, section 5.5.6.2. Before a cell re-selection (for UEs in RRC IDLE state) or handover (for UE in RRC CONNECTED state), the UE may estimate its mobility, which may for example be expressed as the number of radio cells crossed within a certain predetermined time period. An example method can be described as follows: Each time the radio cell changes, the UE may increase the number of cell re-selections or handovers by one. If the number of radio cell changes exceeds a high threshold within the predetermined time, the UE determines that the UE is in a high-mobility state. If the radio cell changes does not exceed the high threshold but exceeds a medium threshold, the UE determines that the UE is in a medium-mobility state. Otherwise, the UE determines that it is in normal-mobility-state. Based on this mobility state estimation, the UE may adjust its parameter configuration. With reference to FIG. 9, an example embodiment of a method for adjusting the parameter configuration is illustrated. The UE estimates 910 its mobility state. Based on this estimated mobility state, the UE subsequently adjusts 920 the parameter configuration depending on whether the UE is estimated to be in a high-mobility state, medium-mobility state, or normal mobility state. It will be appreciated that more levels of mobility states are conceivable and the above three levels are only used as a non-limiting example. For example, a timer value and/or a counter value comprised in the parameter configuration can be adjusted depending on the estimated mobility state. It is proposed to apply shorter timer values and/or lower counter values, the higher the mobility state is.

It should be appreciated that the embodiment shown in FIG. 9 does not necessarily have to be implemented in combination with any of the embodiments described with respect to FIGS. 5-8. Rather, this embodiment could equally possible be implemented separately, i.e. without first defining the aforementioned parameter in dependence of a length of the extended DRX time period. In other words, the aspect of estimating a mobility state of the UE and adjusting the parameter configuration depending on the estimated mobility state of the UE could be realized separately in an own embodiment.

Embodiments of the present invention also include the network aspects for configuring the UE with configuration data including a parameter configuration to be used by the UE upon the UE detecting connectivity problems towards a radio cell. On the radio network side, the rationale for providing such configuration data to be used upon the UE detecting connectivity problems towards the first, i.e. serving, cell to a UE or a group of UEs is that handovers may be particularly challenging in some deployments. Hence, it may occur that one has to resort to connection recovery as initiated by the UE in particular regions. Therefore, there is an incentive to speed up this recovery at places where such challenges are likely to occur.

Figure 10:
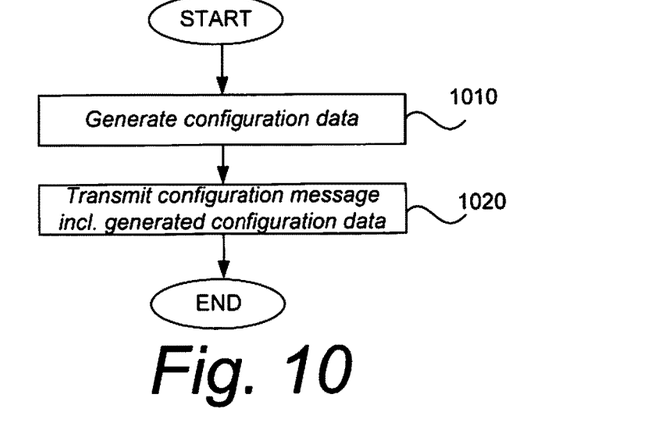
FIG. 10 shows a flowchart of a method according to an embodiment performed in a radio network node.

FIG. 10 shows an example embodiment of a method performed by a radio network node. The radio network node may be embodied as an evolved NodeB (eNB). Configuration data is generated 1010. This configuration data comprises a parameter configuration. The parameter configuration is generated in dependence of the length of the extended DRX time period configured for the UE in question, or for a group of UEs.

Figure 11:
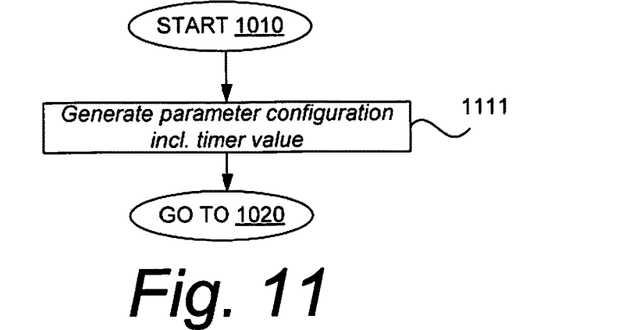
FIG. 11 shows a flowchart of a method according to an embodiment performed in a radio network node.

With reference to FIG. 11, generating 1010 the configuration data may comprise generating 1111 a parameter configuration comprising a timer value, e.g. a timer value T310. Advantageously, this timer value is configured to be shorter the longer the extended DRX time period is. For example, the timer value can be set to any of the following values (in milliseconds): 1000, 900, 800, 700, 600, 500, 400, 300, 200, 100, 75, 50, 25, 10, as described previously.

Figure 12:
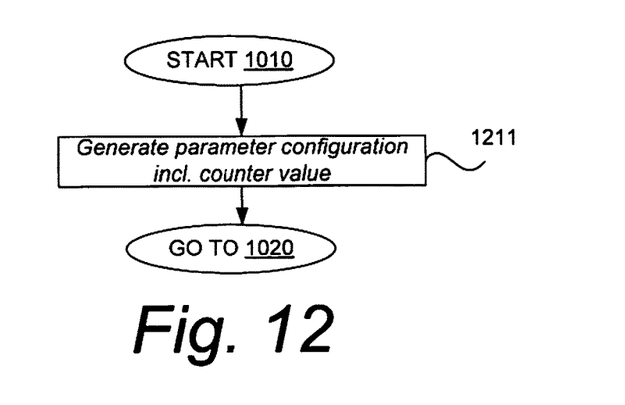
FIG. 12 shows a flowchart of a method according to an embodiment performed in a radio network node.

With reference to FIG. 12, generating 1010 the configuration data may additionally, or alternatively, comprise generating 1211 a parameter configuration comprising a counter value, e.g. a counter value N310. Advantageously, this counter value is configured to be lower the longer the extended DRX time period is. For example, the counter value can be set to any of the following values: 10, 9, 8, 7, 6, 5, 4, 3, 2, 1, as described previously.

The generated configuration data thus including the parameter configuration having either or both of a timer value and a counter value is then transmitted 1020 in a configuration message to one or more UEs for use by the one or more UEs for monitoring RLF.

The radio network node may transmit 1020 a configuration message including a parameter configuration to a UE or a group of UEs from time to time, e.g. at regular intervals.

This way, the radio network node may refresh the parameter configuration from time to time. As will be understood, timer values and/or counter values can hence be changed, or otherwise updated, from time to time.

Figure 13:
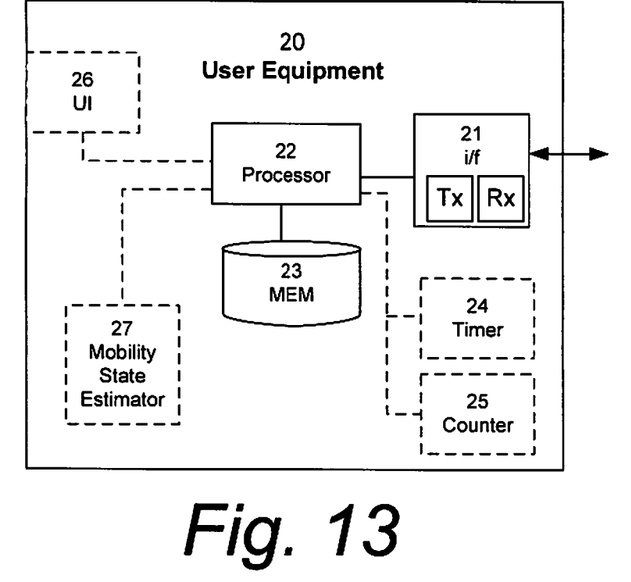
FIG. 13 shows an example embodiment of a user equipment.

Turning now to FIG. 13, an example embodiment of a UE 20 will be described. The UE 20 is configured for an extended DRX time period. That is, a DRX time period which is longer than an ordinary DRX time period (i.e. at least longer than 2.56 seconds, as previously described). Furthermore, the UE 20 may be configured to implement hereinabove described methods. For example, the UE may be a MTC device. The UE 20 may comprise a communication interface i/f 21 configured for wireless communication. In this example embodiment, the communication interface 21 comprises a receiver and a transmitter. In alternative embodiments, the receiver and transmitter functionalities are combined into one single unit, a transceiver. The UE 20 may also comprise a processor 22 and a memory 23. Still further, the UE 20 may comprise a timer 24. Additionally, or alternatively, the UE 20 may comprise a counter 25. The UE 20 may additionally comprise a user interface 26 through which a user can operate and interact with the UE 20.

In this example embodiment, the memory 23 stores computer program code, which, when run in the processor 22 causes the UE 20 to retrieve configuration data, the configuration data including a parameter configuration which is defined in dependence of the length of extended DRX time period; and upon detection of connectivity problems towards a radio cell, applying the parameter configuration for monitoring radio link failure.

In this example embodiment, the parameter configuration comprises a timer value. The memory 23 may store computer program code, which, when run in the processor 22 causes the UE 20 to start the timer 24 and apply said timer value in the timer 24. Furthermore, the memory 23 may store computer program code, which, when run in the processor 22 causes the UE 20 to initiate connection re-establishment to another radio cell upon expiration of said timer value. Additionally, or alternatively, the parameter configuration may comprise a counter value. The memory 23 may store computer program code, which, when run in the processor 22 causes the UE 20 start the counter 25 and apply said counter value in the counter 25. Moreover, the memory 23 may store computer program code, which, when run in the processor 22 causes the UE 20 to start the timer 24 when the counter 25 reaches said counter value. Additionally, or alternatively, the memory 23 may store computer program code, which, when run in the processor 22 causes the UE 20 to initiate connection re-establishment to another radio cell when the counter 25 reaches said counter value.

In one embodiment, the UE 20 is configured to retrieve the aforementioned configuration data (including the parameter configuration) from the memory 23 of the UE. Additionally, or alternatively, the UE 20 may be configured to receive, by means of the receiver of the communication interface 21, a configuration message from a radio network. The configuration message may comprise the configuration data including the parameter configuration the UE 20 is configured to retrieve, or otherwise read, the configuration data from the received configuration message.

In still another embodiment, the UE 20 may optionally comprise a mobility state estimator 27. The mobility state estimator 27 may be configured to estimate the mobility state of the UE 20. The memory 23 may further store computer program code, which, when run in the processor 22 causes the UE 20 adjust a parameter configuration depending on an estimated mobility state of the UE 20.

Figure 14:
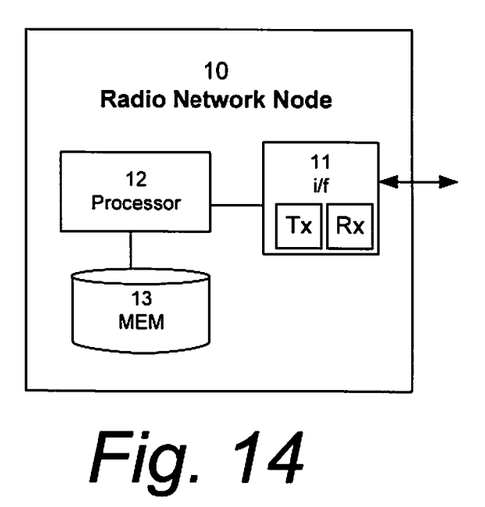
FIG. 14 shows an example embodiment of a radio network node.

Turning now to FIG. 14, an example embodiment of a radio network node 10 will be described. The radio network node may be embodied as en evolved NodeB (eNB). Furthermore, the radio network node 10 may be configured to perform hereinabove described methods. The radio network node 10 may comprise a communication interface i/f 11 configured for wireless communication. In this example embodiment, the communication interface 11 comprises a receiver and a transmitter. In alternative embodiments, the receiver and transmitter functionalities are combined into one single unit, a transceiver. The radio network node may also comprise a processor 12 and a memory 13.

The memory 13 stores computer program code, which, when run in the processor 12 causes the radio network node 10 to generate configuration data including a parameter configuration. The parameter configuration is generated in dependence of a length of an extended discontinuous reception DRX time period used by a UE or a group of UEs. The extended DRX time period is generally longer than an ordinary DRX time period, as described earlier. Furthermore, the transmitter 11 is configured to transmit a configuration message to a UE or a group of UEs, wherein the configuration message comprises the generated configuration data.

The memory 13 may store computer program code, which, when run in the processor 12 causes the radio network node 10 to generate a parameter configuration comprising a timer value for use by a UE or a group of UEs when monitoring radio link failure. The memory 13 may store computer program code, which, when run in the processor 12 causes the radio network node 10 generate a timer value to be shorter the longer the extended DRX time period is.

The memory 13 may store computer program code, which, when run in the processor 12 causes the radio network node 10 to generate a parameter configuration comprising a counter value for use by a UE or a group of UEs when monitoring radio link failure. The memory 13 may store computer program code, which, when run in the processor 12 causes the radio network node 10 generate a counter value to be lower the longer the extended DRX time period is.

The various embodiments disclosed herein provide for improved handling of radio link monitoring, which in turn may lead to a reduced number of unnecessary handover failures. More particularly, the various embodiments disclosed herein may allow for improved handling of radio link monitoring for UEs configured for extended DRX time periods, i.e. DRX time periods that are comparatively longer than ordinary (or, normal) DRX time periods. The various embodiments disclosed herein may provide for a relatively quick connection re-establishment procedure for UEs operating with extended DRX time periods. Consequently, it is made possible to prevent the triggering of handovers that could otherwise occur for UEs operating with extended DRX time periods. MTC devices are a typical example of a UE that could benefit from longer, i.e. extended, DRX time periods. Therefore, it is believed that the various embodiments described herein are particularly suitable or appealing for MTC devices, which operate with extended DRX time periods.

In the detailed description hereinabove, for purposes of explanation and not limitation, specific details are set forth such as particular architectures, interfaces, techniques, etc. in order to provide a thorough understanding of various embodiments of the present invention. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method, performed by a user equipment (UE), for monitoring radio link failure between the UE and a radio network, wherein the UE is configured for an extended discontinuous reception (DRX) time period having a length that is longer than an ordinary DRX time period, the method comprising:
    retrieving configuration data, the configuration data including a parameter configuration which is defined based on a length of the extended DRX time period, wherein the configuration parameter comprises a timer value and a counter value for use in an extended DRX mode; and
    in response to detection of connectivity problems towards a radio cell while in the extended DRX mode, starting a timer upon reaching the counter value when a measurement event related to a handover is detected, for monitoring the radio link failure, wherein upon detection of the connectivity problems, the parameter configuration is applied to the timer and counter or the parameter configuration is utilized by the UE for monitoring the radio link failure,
    wherein the parameter configuration is for initiating connection re-establishment to another radio cell upon expiration of the timer value and the counter value for monitoring the radio link failure.

2. The method of claim 1, wherein the timer value is shorter the longer the extended DRX time period is.

3. The method of claim 1, wherein the parameter configuration comprises
    a counter value; and
    further comprising starting the timer upon reaching the counter value.

4. The method of claim 3, wherein the counter value is lower the longer the extended DRX time period is.

5. The method of claim 1, wherein the parameter configuration comprises
    a counter value; and
    further comprising initiating connection re-establishment to another radio cell upon reaching the counter value.

6. The method of claim 5, wherein the counter value is lower the longer the extended DRX time period is.

7. The method of claim 1, wherein the extended DRX time period has a length that is longer than 2.56 seconds.

8. The method of claim 1, wherein the retrieving configuration data comprises retrieving the configuration data from a memory of the UE.

9. The method of claim 1, wherein the retrieving configuration data comprises receiving a configuration message from the radio network; wherein the configuration message comprises the configuration data including the parameter configuration.

10. The method of claim 1, further comprising:
    estimating a mobility state of the UE; and
    adjusting the parameter configuration based on the estimated mobility state of the UE.

11. A method, performed by a radio network node, for monitoring radio link failure between a radio network and a user equipment (UE), the method comprising:
    generating configuration data including a parameter configuration, wherein the parameter configuration is generated based on a length of an extended discontinuous reception (DRX) time period used by a UE and wherein the extended DRX time period has a length that is longer than an ordinary DRX time period, and wherein the parameter configuration comprises a timer value and a counter value for a timer and counter that is started responsive to detection of a connectivity problem by the user equipment while in an extended DRX mode, wherein the timer value starts upon reaching the counter value to detect the connectivity problem towards a radio cell; and transmitting a configuration message to the UE, wherein the configuration message comprises the generated parameter configuration, wherein the parameter configuration is applied to the timer and the counter or the parameter configuration is utilized by the UE for monitoring the radio link failure.

12. The method of claim 11, wherein the generating configuration data comprises generating a parameter configuration comprising a timer value for use when monitoring radio link failure.

13. The method of claim 12, wherein the generating the parameter configuration comprises generating a timer value to be shorter the longer the extended DRX time period is.

14. The method of claim 11, wherein the generating configuration data comprises generating a parameter configuration comprising a counter value for use when monitoring radio link failure.

15. The method of claim 14, wherein the generating the parameter configuration comprises generating a counter value to be lower the longer the extended DRX time period is.

16. The method of claim 11, wherein the extended DRX time period has a length that is longer than 2.56 seconds.

17. A user equipment (UE) for monitoring radio link failure between the UE and a radio network, wherein the UE is configured for an extended discontinuous reception (DRX) time period having a length that is longer than an ordinary DRX time period, the UE comprising:

processing circuit; and memory storing computer program code, the computer program code configured to cause, when run by the processing circuit, the UE to:

retrieve configuration data, the configuration data including a parameter configuration which is defined in based on a length of extended DRX time period, wherein the parameter configuration comprises a timer value and a counter value for use in an extended DRX mode; and in response to detection of connectivity problems towards a radio cell while in the extended DRX mode, start a timer upon reaching the counter value when a measurement event related to a handover is detected, for monitoring the radio link failure, wherein upon detection of the connectivity problems, setting the timer or counter according to the parameter configuration or the parameter configuration is utilized by the UE for monitoring the radio link failure, wherein the parameter configuration is for initiating connection re-establishment to another radio cell upon expiration of the timer value and the counter value for monitoring the radio link failure.

18. The UE of claim 17, wherein the UE is a Machine-Type-Communication (MTC) device.

19. A radio network node for monitoring radio link failure between a radio network and a user equipment (UE), the radio network node comprising:

a transmitter;

a processing circuit; and memory storing computer program code, the computer program code configured to cause, when run by the processing circuit, the radio network node to:

generate configuration data including a parameter configuration, wherein the parameter configuration is generated based on a length of an extended discontinuous reception (DRX) time period used by the UE; wherein the extended DRX time period has a length that is longer than an ordinary DRX time period, and wherein the parameter configuration comprises a timer value and a counter value for a timer and counter that is started responsive to detection of a connectivity problem by the user equipment while in an extended DRX mode, wherein the timer value starts upon reaching the counter value to detect the connectivity problem towards a radio cell; and wherein the transmitter is configured to transmit a configuration message to the UE, wherein the configuration message comprises the generated parameter configuration, wherein the parameter configuration is applied to the timer and the counter or the parameter configuration is utilized by the UE for monitoring the radio link failure.

20. The radio network node of claim 19, wherein the radio network node is an evolved NodeB (eNB).

21. The method of claim 1, wherein at least one parameter of the parameter configuration is inversely proportional to the length of the extended DRX time period.

22. The method of claim 1, wherein the detection of the connectivity problems towards the radio cell includes receiving an out-of-sync indication.

23. The method of claim 1, wherein the timer value is related to initiating connection re-establishment to another radio cell.

24. The method of claim 3, wherein the counter value represents a maximum number of consecutive out-of-sync indications received by the wireless device.

25. The method of claim 1, further comprising:
measuring a received signal quality or a received signal power from a serving cell while in the extended DRX mode; and
detecting the connectivity problems based on the received signal quality or the received signal power.

26. The method of claim 25, wherein detecting the connectivity problems based on the received signal quality or the received signal power comprises:
comparing the received signal quality or the received signal power to threshold values; and
determining that connectivity problems exists when the received signal quality or the received signal power is less than the threshold values,
wherein the UE detects the connectivity problems when receiving an out-of-sync indication from a physical layer.

27. The user equipment of claim 17, further comprising computer program code that when executed by the processing circuit causes the user equipment to:
measure a received signal quality from a serving cell while in the extended DRX mode; and
detect the connectivity problems based on the received signal quality.

28. The user equipment of claim 27, further comprising computer program code that when executed by the processing circuit causes the user equipment to:
compare the received signal quality to a threshold; and determine that connectivity problems exists when the received signal quality is less than the threshold.

* * * * *